United States Patent [19]

Schäfer et al.

[11] 4,061,710

[45] Dec. 6, 1977

[54] MOLDED ARTICLES

[75] Inventors: Werner Schäfer, Diedenbergen; Wolfram Busch, Massenheim-Gartenstadt; Hermann Wallhäusser, Taunusstein-Wehen; Manfred Richter; Siegfried Wilhelm, both of Wiesbaden, all of Germany

[73] Assignee: Rutgerswerke Aktiengesellschaft, Frankfurt am Main, Germany

[21] Appl. No.: 585,619

[22] Filed: June 10, 1975

[30] Foreign Application Priority Data

June 14, 1974 Germany ............................ 2428629

[51] Int. Cl.$^2$ ..................... B29G 3/00; C08G 12/32
[52] U.S. Cl. ..................................... 264/300; 260/21; 260/29.1 SB; 260/31.8 T; 260/39 R
[58] Field of Search ......... 260/29.1 SB, 39 R, 30.8 R, 260/32.6 N, 21, 31.8 T; 264/211, 300

[56] References Cited

U.S. PATENT DOCUMENTS

| 3,288,902 | 11/1966 | Schuller et al. ............ 264/300 |
| 3,338,851 | 8/1967 | Taylor et al. ............... 260/39 R |
| 3,577,492 | 5/1971 | Welsh et al. ................. 264/300 |
| 3,786,041 | 1/1974 | Talsma ........................ 260/39 R |
| 3,789,041 | 1/1974 | Talsma ........................ 260/39 R |
| 3,811,903 | 5/1974 | Daskivich .................... 264/211 |

FOREIGN PATENT DOCUMENTS 1,235,862  6/1971  United Kingdom.
1,243,026  8/1971  United Kingdom.

OTHER PUBLICATIONS

Chemical Abstracts, 1967, vol. 67, p. 82702a.

Primary Examiner—Murray Tillman
Assistant Examiner—Arthur H. Koeckert
Attorney, Agent, or Firm—Hammond & Littell

[57] ABSTRACT

A moulding composition comprising (a) a melamineformaldehyde resin having a molar ratio of melamine to formaldehyde in the range 1:1.5 to 1:2.5 which upon hardening is capable of withstanding heating at 200° C concerned for 2 hours in air without causing significant structural damage or color change to moulded articles made from moulding compositions in which it has been incorporated, (b) an accelerator derived from a mono- or dibasic organic acid, (c) an inorganic filler having low adsorption characteristics and an oil adsorption value of 10 to 40, (d) a further inorganic filler and (e) an external lubricant comprising at least one carboxyorganosiloxane esterified with an alcohol containing up to 4 carbon atoms and the process of preparing said moulding compositions.

13 Claims, No Drawings

MOLDED ARTICLES

This invention relates to moulding compositions containing melamine-formaldehyde resins and their use in the manufacture of thermally stable moulded articles.

There is an increasing demand for plastics which will withstand high thermal and electrical loads. Thus, for example, plastic parts of household articles such as cookers, grills and toasters must withstand high temperatures without deterioration of their structure, colour and strength if a long working life is to be guaranteed. Plastics which are thermally stable are of particular interest in the electrical field, for example in the manufacture of lamp sockets, headlamp housings, reflectors and fuse wire inserts. These parts are exposed to a high thermal and electrical load but must not be damaged thereby.

In addition to the other necessary properties hitherto demanded of moulded articles, such as a high modulus of elasticity, a high mechanical strength, a low water absorption, good electrical properties, low shrinkage characteristics, colour-fastness to light and resistance to tropical conditions, they should also be able to withstand high thermal loads, such as those described for example in the Vereins Deutscher Elektroingenieure (VDE) Standard 0304. This requires that there is a minimal degree of damage to the structure and at the same time that the surfaces of the relevant parts are perfect after tempering, i.e. they should not have any tears, cracks or cavities and should retain their gloss and original colour.

Moulded articles based on melamine resins generally require organic fillers and reinforcing agents, e.g. wood dust, cellulose powder or cotton fibres, to give them strength. Such products do not withstand thermal loads of above 170° C. They crack and after a short time, lose the properties originally imparted by the fillers and reinforcing agents. Even if thermally inert inorganic fillers and reinforcing agents are added to the moulding composition, moulded articles produced therefrom still do not possess the necessary thermal resistance, since the modified melamine resins themselves which have been used hitherto do not meet the thermal requirements. Articles made from such moulding compositions crack or fracture when subjected to thermal loads for fairly long periods with the result that the structure and the surface are quite substantially damaged. All attempts to reduce these difficulties by using known fillers and reinforcing substances with special thermal properties in order to obtain moulded articles which are thermally stable have hitherto failed.

There have been numerous proposals to obtain moulded articles with good thermal properties and which are free of bubbles, cracks and cavities from melamine resins moulding compositions. Attempts have been made to reduce the deterioration of the mechanical properties resulting from thermal stress by using specific tempering processes. To this end, attempts have been made to carefully remove low boiling volatile components and occluded gases in the resin from the moulded articles by slowly raising the temperature to the required load temperature without causing a spontaneous increase in the volume of gas inside the articles. Operations of this kind have to be performed with extreme care and yield moulded articles which have only limited thermal stability as quantative removal of volatile components has not as yet been achieved. In addition these processes are very expensive, can only be carried out discontinuously and are therefore impractical for most purposes.

The problem of producing moulded articles which are colour fast under high thermal loads has hitherto presented a serious difficulty since not only do the resins and fillers used crack (as has already been mentioned) thus considerably altering the colour, but also the internal and external lubricants hitherto used are often carbonised to such an extent that substantial alteration of the colour results. Plasticiser additives, plasticising adjuvants and thermally unstable dyes generally used also have the same result.

According to the present invention we now provide a moulding composition comprising (a) a melamine-formaldehyde resin having a molar ratio of melamine to formaldehyde in the range 1:1.5 to 1:2.5 and being heat resistant (as herein defined ) at 200° C. (b) an accelerator derived from a mono- or dibasic organic acid, (c) an inorganic filler having low absorption characteristics and an oil adsorption value (as herein defined) of 10 to 40, (d) a further inorganic filler and (e) an external lubricant comprising at least one carboxyorganosiloxane esterified with an alcohol containing up to 4 carbon atoms.

The expression "heat resistant" is used herein in relation to melamine-formaldehyde resins to designate such resins which upon hardening are capable of withstanding heating at the temperature concerned for 2 hours in air without causing significant structural damage or colour change to moulded articles made from moulding compositions in which they have been incorporated.

Since components are used which, when subjected to high thermal loads over a fairly long period, do not yellow, carbonise or crack and thus do not change their original colour, we have succeeded in producing moulded articles from moulding compositions according to the invention which can be exposed to high thermal loads and shocks without deleterious effect on the quality, colour or strength of the surface of the articles.

The melamine resins which may be used are those which, in the hardened state, do not turn dark in colour and do not undergo structural damage when heated in air for two hours at temperatures up to 200° C, and preferably when heated for 2 hours at temperatures up to 280° C. These requirements are met in for example non-modified, unetherified melamine resins. The resin content of the moulding composition is generally 25 to 60, preferably 30 to 50% by weight of the total composition.

The melamine resins used in the compositions according to the invention contain a low proportion of formaldehyde and it is therefore necessary to increase their hardening rate by adding latent accelerators in order to ensure economic production of moulded articles. As latent accelerators, there may be used reaction products of melamine with saturated or olefinically unsaturated mono- or dicarboxylic acids or with organic sulphonic acids.

Preferred latent accelerators include those wherein the acid component is benzoic, phthalic, isophthalic, terephthalic, adipic, sebacic, maleic or fumaric acid, benzene mono- or disulphonic acid, or a phenol or toluene mono- or disulphonic acid. Generally the latent accelerator is present in an amount of 0.01 to 2, preferably 0.1 to 0.7% by weight of the total moulding composition.

Lubricants which may be used in the moulding compositions are those which, like the other components, are not decomposed to form coloured substances at the temperatures used. An external lubricant or mould release agent is a substance which predominantly reduces the adhesion of the moulding composition to metal surfaces of the mould, and an internal lubricant effects a reduction in the friction between the particles in the moulding composition.

The external lubricants used according to the invention are carboxyorganosiloxanes esterified with alcohols containing up to 4 carbon atoms preferably methanol. Their chemical structure resembles that of a linear methyl silicon with an Si—O—Si chain running through it but having a large number of the alkyl groups replaced by ester groupings. Advantageously esterified carboxyorganosiloxanes having the following characteristics are used: acid number less than 5, preferably 2 to 4; saponification number 150 to 300, preferably 200 to 250; molecular weight 800 to 2000, preferably 1000 to 1300; $SiO_2$ content 15 to 30, preferably 20 to 25% by weight. As external lubricant there may be used, in admixture with the carboxyorganosiloxane, salts of saturated or olefinically unsaturated fatty acids with 12 to 20 carbon atoms, preferably salts of stearic, palmitic, oleic, linoleic and linolenic acid for example the magnesium, calcium, zinc and aluminium salts. Such fatty acid salts may be present in amounts up to 100% by weight of the carboxyorganosiloxane used, i.e. not more than 50% by weight of the total external lubricant, and should not exceed 0.4% by weight of the total composition.

Internal lubricants are not necessarily included in the moulding compositions, although if desired they may be incorporated. It is, however, in general necessary to add such lubricants to injection moulding compositions. Internal lubricants which may be added to the moulding compositions according to the invention include for example esters of aliphatic and aromatic mono- and polycarboxylic acids containing up to 18 carbon atoms with saturated or olefinically unsaturated, aliphatic (including cycloaliphatic), mono- or polyhydric alcohols with 2 to 9 carbon atoms and amides and sulphonates of fatty acids with 16 to 24 carbon atoms. Esters of stearic, palmitic, coconut oil, ricinoleic, adipic, sebacic, maleic, fumaric, benzoic, phthalic, isophthalic, terephthalic, trimellitic, pyromellitic acid and hydrocarboxylic acids such as salicylic acid, may be used as internal lubricants. Particularly preferred are esters of phthalic, isophthalic and terephthalic acids of general formula

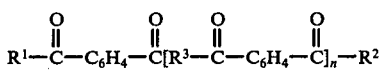 (I)

[wherein $R^1$ and $R^2$ which may be the same or different represent alkoxy (including cycloalkoxy) groups containing from 2 to 9 carbon atoms, $R^3$ represents an oxyalkyleneoxy (including oxycycloalkyleneoxy) group containing from 2 to 9 carbon atoms and $n$ is an integer from 0 to 8], for example esters of general formula I wherein $R^1$ and $R^2$ represent alkoxy groups from a butyl, octyl, nonyl, allyl or cyclohexyl alcohol and $R^3$ represents an oxyalkyleneoxy group from ethylene glycol, diethylene glycol or a propane, butane or cyclohexanediol.

The external lubricants are generally present in amounts of 0.1 to 1.5, preferably 0.3 to 0.8% by weight, and the internal lubricants are present, if at all, in amounts of 0.1 to 3, preferably 0.3 to 1% by weight, based on the total composition.

To obtain surfaces of a smooth nature and having a homogeneous distribution of colouring pigments contained therein, it is necessary to incorporate an inorganic filler (c) with low adsorption characteristics and an oil adsorption number of from 10 l to 40. The oil adsorption number referred to herein indicates the quantity of linseed oil expressed in milligrams which one gram of the filler can take up without changing into a viscous state. Carbonates, sulphates and oxides of calcium and magnesium fulfil these requirements.

In addition to the filler (c) used for improving the surface properties, a further inorganic filler (d) which is preferably thermostable at 250° C, is incorporated. Inert silicates, e.g. calcium metasilicate, are especially suitable The total proportion of inorganic fillers (c) and (d) generally present is up to 65% by weight of the total composition and the weight ratio of filler (c) to filler (d), i.e. the weight ratio of surface-improving filler to inert silicate, is generally from 1:1 to 1:10.

In addition, reinforcing agents to increase the mechanical resistance and heat stability of the composition may if desired be used, for example glass fibres, asbestos fibres and other mineral fibrous substances, e.g. mineral wool and metal titanates, as well as thermostable organic synthetic fibres which may be coloured with a fast dye.

Dyes and pigments may also be incorporated into the compositions as desired, preferably those which are resistant to yellowing, carbonising and cracking, such as zinc sulphide, barium sulphate, titanium dioxide, iron oxide, carbon black and organic pigments and dyes.

The moulding compositions according to the invention are especially suitable for the manufacture of electrical components which are electrical insulators, in particular thermally highly chargeable insulators, circuit parts and switch boards. Moreover, due to their good manufacturing properties, the moulding compositions may be used for the production of thermally insulating fittings and components of household equipment for example pan and tool handles and cooker mouldings.

The following Examples serve to illustrate the moulding compositions according to the invention and moulded articles produced therefrom. In the Examples, T represents parts by weight and all percentages are by weight.

EXAMPLE 1

30T of a melamine/formaldehyde powder resin [obtained by condensation of melamine with formaldehyde in a molar ratio of 1:1.6 at a pH of 9 with barium hydroxide as catalyst until a compatibility ratio with water (i.e. the resin: water ratio at which the solution still shows no turbidity) of 1:1.5 is obtained] are intimately mixed with 40 T of calcium metasilicate, 13 T of calcium carbonate, 0.2 T of melamine benzenesulphonate, 0.2 T of a siloxane (characteristics: acid number 3.5, saponification number 220, molecular weight 1180 and $SiO_2$ content 23%), 0.2 T of magnesium stearate, and 9 T of a grey dye mixture consisting of a zinc sulphide, iron oxide and carbon black dye (manufactured by Degussa, Hanau, Federal Republic of Germany). The mixture is then homogenised at 120° to 130° C. Standard bars 10 mm thick are moulded from this moulding composition in a moulding period of 10 minutes at 160° to 170° C and are then heated at 250° C in the air for 10 hours. The moulded articles can be heated either rapidly or slowly. After thermal treatment, the moulded articles are free from cracks and bubbles and there is no change in their light grey colour.

COMPARISON EXAMPLE 1

Effect of Modifying the Melamine Resin.

A moulding composition analogous to that used in Example 1, except that the melamine/formaldehyde powder resin is replaced by a resin modified with 12% of sorbitol, is processed into standard bars and tested. After heat treatment, the moulded articles are black.

COMPARISON EXAMPLE 2

Effect of Changing the Molar Ratio in the Melamine Resin

A moulding composition analogous to that used in Example 1 except that it contains a powdered resin made from melamine and formaldehyde in a molar ration of 1:3 is processed into standard bars and tested. On heat treatment the moulded articles crack.

COMPARISON EXAMPLE 3

Effect of the External Lubricant

A moulding composition analogous to that used in Example 1, except that the siloxane has been replaced by 1 T of magnesium stearate is processed into standard bars and heat-treated. The moulded articles turn black.

EXAMPLE 2

Injection Moulding Composition

A 60% aqueous solution of the melamine/formaldehyde resin used in Example 1 (corresponding to 40 T of resin) is homogeneously mixed in a kneader with 30 T of calcium metasilicate, 30 T of calcium carbonate, 0.1 T of melamine benzenesulphonate, 0.5 T of dioctyl phthalate, 0.4 T of magnesium stearate, 0.4 T of the siloxane used in Example 1 and 8 T of the dye mixture used in Example 1 and then granulated to form a moulding composition. After drying at approximately 80° C, the moulding composition, which has a residual moisture content of 1 to 2%, is ground and is then processed into moulded articles which have the same good thermal stability as the articles produced in Example 1.

COMPARISON EXAMPLE 4

Effect of the Latent Accelerator.

A moulding composition is prepared analogously to Example 2 but omitting the melamine benzenesulphonate component. The composition, however, owing to the absence of the hardening catalyst, requires three times the hardening time to produce satisfactory bubble-free moulded articles. On subsequent thermal testing, it is apparent that the complete, homogeneous, thorough hardening necessary for thermal resistance at 250° has not been achieved. This can be seen from the formation of cracks and bubbles in the test article.

EXAMPLE 3

Injection Moulding Composition

40 T of the melamine/formaldehyde resin used in Example 1 are mixed with 30 T of calcium metasilicate, 28 T of calcium carbonate, 0.1 T of melamine benzenesulphonate, 1 T of dioctyl phthalate, 0.4 T of the siloxane used in Example 1, 0.4 T of magnesium stearate and 6 T of the dye mixture used in Example 1, and the mixture is processed in a Buss-Ko kneader PR 46 (manufactured by Buss AG, Basle/Switzerland) (working conditions: temperature of casing 80° C, non-heated screw at 40 r.p.m., throughput approximately 800 kg/h) to form a moulding composition. Moulded articles produced therefrom give good test results analogously to Example 1.

COMPARISON EXAMPLE 5

Effect of the Internal Lubricant

A composition is prepared analogously to Example 3, but omitting the dioctyl phthalate. The mixture hardens immediately in the kneader without plasticising and cannot be processed into a moulding composition.

What we claim is:

1. A moulding composition comprising (a) a non-modified, unetherified melamine-formaldehyde resin having a molar ratio of melamine to formaldehyde in the range 1:1.5 to 1:2.5 which upon hardening is capable of withstanding heating at 200° C for 2 hours in air without causing significant structural damage or color change to moulded articles made from moulding compositions in which it has been incorporated, (b) a latent accelerator being a reaction product of melamine with at least one component selected from the group consisting of (1) an at most olefinically unsaturated at most dibasic carboxylic acid and (2) an organic sulfonic acid, (c) an inorganic filler having low adsorption characteristics and an oil adsorption value of 10 to 40, (d) a further inorganic filler and (e) an external lubricant comprising at least one carboxyorganosiloxane esterified with an alcohol containing up to 4 carbon atoms, the melamine-formaldehyde resin (a) being present in an amount of from 25 to 60% by weight, the accelerator (b) being present in an amount of from 0.01 to 2% by weight, the total amount of inorganic fillers (c) and (d) being at most 65% by weight, the weight ratio of filler (c) to filler (d) being from 1:1 to 1:10, and the total external lubricant (e) being present in the amount of from 0.1 to 1.5% by weight, all proportions being refered to the total composition.

2. A composition as claimed in claim 1 wherein the weight ratio of filler (c) to filler (d) is from 1:1 to 1:10.

3. A composition as claimed in claim 1 wherein the external lubricant (e) additionally comprises a salt of a saturated or olefinically unsaturated fatty acid containing from 12 to 20 carbon atoms.

4. A composition as claimed in claim 3 wherein the fatty acid salt is present in an amount up to 50% by weight of the total external lubricant (e) but not more than 0.4% by weight of the total composition.

5. A composition as claimed in claim 13 wherein the internal lubricant (f) is present in an amount of from 0.1 to 3% by weight of the total composition.

6. A process for the production of a moulded body which comprises forming a moulding composition of claim 1 into a desired body shape and heating to effect hardening of the moulding composition.

7. A process as claimed in claim 6 wherein the shaping is effected by injection moulding using a moulding composition which contains an internal lubricant (f) selected from the group consisting of 1. esters of a aliphatic and aromatic mono- and polycarboxylic acids containing up to 18 carbon atoms with at most olefinically unsaturated aliphatic, cycloaliphatic alcohol, with 2 to 9 carbon atoms, 2. an amide of a fatty acid containing 16 to 24 carbon atoms and
3. sulfonate of a fatty acid containing 16 to 24 carbon atoms.

8. A moulded body obtained by hardening a composition as claimed in claim 1 which moulded body is an insulating fitting.

9. A composition as claimed in claim 1 wherein the external lubricant (e) has the following characteristics: acid number less than 5, saponification number 150 to 300; molecular weight 800 to 2000; $SiO_2$ content 15 to 30% by weight.

10. A composition as claimed in claim 1 which additionally contains from 0.01 to 3% by weight of the total composition of an internal lubricant (f) selected from the group consisting of
1. esters of aliphatic and aromatic mono- and polycarboxylic acids containing up to 18 carbon atoms with at most olefinically unsaturated aliphatic, cycloaliphatic alcohols with 2 to 9 carbon atoms,
2. an amide of a fatty acid containing 16 to 24 carbon atoms and
3. a sulfonate of a fatty acid containing 16 to 24 carbon atoms.

11. A moulding composition as claimed in claim 1 comprising a non-modified, unetherified melamine-formaldehyde resin having a molar ratio of melamine to formaldehyde in the range from 1:1.5 to 1:2.5 which upon hardening is capable of withstanding heating at 200° C for 2 hours in air without causing significant structural damage or color change to moulded articles made from moulding compositions in which it has been incorporated, (b) a latent accelerator which is a reaction product being a reaction product of melamine with at least one component selected from the group consisting of (1) an at most olefinically unsaturated at most dibasic carboxylic acid and (2) an organic sulfonic acid, (c) an inorganic filler having low adsorption characteristics and an oil adsorption value of 10 to 40 selected from the group consisting of carbonates, sulfates and oxides of calcium and magnesium, (d) a further inorganic filler which is thermostable at 250° C and which is an inert silicate and (e) an external lubricant based on at least one carboxyorganosiloxane esterified with an alcohol containing up to 4 carbon atoms with the characteristics:acid number less than 5; saponification number 150 to 300; molecular weight 800 to 2000; $SiO_2$ content 15 to 30% by weight; the melamine-formaldehyde resin (a) being present in an amount of from 25 to 60% by weight, the accelerator (b) being present in an amount of from 0.01 to 2% by weight, the total amount of inorganic fillers (c) and (d) being at most 65% by weight, the weight ratio of filler (c) to filler (d) being from 1:1 to 1:10, and the total external lubricant (e) being present in an amount of from 0.1 to 1.5% by weight, all proportions being referred to the total composition.

12. A moulding composition as claimed in claim 1 comprising a non-modified, unetherified melamine-formaldehyde resin having a molar ratio of melamine to formaldehyde in the range from 1:1.5 to 1:2.5 which upon hardening is capable of withstanding heating at 200° C for 2 hours in air without causing significant structural damage or color change to moulded articles made from moulding compositions in which it has been incorporated, (b) a latent accelerator which is a reaction product of melamine with at least one component selected from the group consisting of (1) an at most olefinically unsaturated at most dibasic carboxylic acid and (2) an organic sulfonic acid, (c) an inorganic filler having low adsorption characteristics and oil adsorption value of 10 to 40 selected from the group consisting of carbonates, sulfates, and oxides of calcium and magnesium, (d) a further inorganic filler which is thermostable at 250° C and which is an inert silicate, (e) an external lubricant based on at least one carboxyorganosiloxane esterified with an alcohol containing up to 4 carbon atoms with the characteristics; acid number less than 5; saponification number 150 to 300; molecular weight 800 to 2000; $SiO_2$ content 15 to 30% by weight and an internal lubricant (f) selected from the group consisting of (1) esters of aliphatic and aromatic mono- and polycarboxylic acids containing up to 18 carbon atoms with at most olefinically unsaturated aliphatic, cycloaliphatic alcohols with 2 to 9 carbon atoms, (2) an amide of a fatty acid containing 16 to 24 carbon atoms and (3) a sulfonate of a fatty acid containing 16 to 24 carbon atoms, the melamine-formaldehyde resin (a) being present in an amount of from 25 to 60% by weight, the accelerator (b) being present in an amount of from 0.01 to 2% by weight, the total amount of inorganic fillers (c) and (d) being at most 65% by weight, the weight ratio of filler (c) to filler (d) being from 1:1 to 1:10, and the total external lubricant (e) being present in an amount of from 0.1 to 1.5% by weight, the internal lubricant (f) being present in an amount of from 0.1 to 3% by weight, all proportions being referred to the total composition.

13. A composition as claimed in claim 1 which additionally contains an internal lubricant (f) selected from the group consisting of
A. at least one ester of phthalic, isophthalic or terephthalic acid of the formula

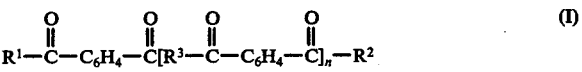

wherein $R^1$ and $R^2$, which may be the same or different, represents alkoxy (including cycloalkoxy) groups containing 2 to 9 carbon atoms, $R^3$ represents an oxyalkyleneoxy (including oxycycloalkyleneoxy) group containing from 2 to 9 carbon atoms and $n$ is an integer from 0 to 8,
B. an amide of a fatty acid containing 16 to 24 carbon atoms and
C. a sulfonate of a fatty acid containing 16 to 24 carbon atoms.

* * * * *